(12) United States Patent
Bhattacharyya et al.

(10) Patent No.: US 11,766,630 B2
(45) Date of Patent: Sep. 26, 2023

(54) METHOD OF USING OXYGENATED METAL COMPOUNDS FOR SELECTIVE EXTRACTION OF LITHIUM SALTS

(71) Applicant: 1s1 Energy, Inc., Portola Valley, CA (US)

(72) Inventors: Sukanta Bhattacharyya, Belmont, CA (US); Daniel Sobek, Portola Valley, CA (US)

(73) Assignee: 1s1 Energy, Inc., Portola Valley, CA (US)

(*) Notice: Subject to any disclaimer, the term of this patent is extended or adjusted under 35 U.S.C. 154(b) by 0 days.

(21) Appl. No.: 17/975,428

(22) Filed: Oct. 27, 2022

(65) Prior Publication Data

US 2023/0047281 A1 Feb. 16, 2023

Related U.S. Application Data

(63) Continuation of application No. PCT/US2021/028860, filed on Apr. 23, 2021.

(60) Provisional application No. 63/016,666, filed on Apr. 28, 2020.

(51) Int. Cl.

| | | |
|---|---|---|
| *B01D 15/38* | (2006.01) | |
| *B01D 15/20* | (2006.01) | |
| *B01D 15/42* | (2006.01) | |
| *B01J 20/08* | (2006.01) | |
| *B01J 20/284* | (2006.01) | |
| *B01J 20/30* | (2006.01) | |
| *B01J 20/34* | (2006.01) | |
| *C01D 15/04* | (2006.01) | |
| *C01D 15/06* | (2006.01) | |

(52) U.S. Cl.
CPC ....... *B01D 15/3823* (2013.01); *B01D 15/203* (2013.01); *B01D 15/426* (2013.01); *B01J 20/08* (2013.01); *B01J 20/284* (2013.01); *B01J 20/3071* (2013.01); *B01J 20/3475* (2013.01); *C01D 15/04* (2013.01); *C01D 15/06* (2013.01); *B01J 2220/52* (2013.01)

(58) Field of Classification Search
CPC .. B01D 15/38; B01D 15/3823; B01D 15/203; B01D 15/426; B01J 20/08; B01J 20/284; B01J 20/3071; B01J 20/3475; B01J 2220/52; C01D 15/04; C01D 15/06

USPC ...................................................... 423/179.5
See application file for complete search history.

(56) References Cited

U.S. PATENT DOCUMENTS

| | | | |
|---|---|---|---|
| 7,691,535 | B2 | 4/2010 | Shiozaki |
| 8,641,992 | B2 | 2/2014 | Galli |
| 9,714,175 | B2 | 7/2017 | Yi |
| 10,505,178 | B2 | 12/2019 | Snydacker et al. |
| 2014/0076734 | A1 | 3/2014 | Calvo |
| 2014/0239221 | A1 | 8/2014 | Harrison |
| 2019/0256987 | A1 | 8/2019 | Snydacker et al. |

FOREIGN PATENT DOCUMENTS

WO 2017202825 5/2017

OTHER PUBLICATIONS

"International Search Report and Written Opinion dated Jul. 21, 2021 in corresponding International Application No. PCT/US2021/028860 with International Filing Date of Apr. 23, 2021".
Flexer, et al., "Lithium recovery from brines—A vital raw material for green energies with a potential environmental impact in its mining and processing", Science of the Total Environment 639 (2018): 1188-1204.
Murodjon, et al., "Lithium Recovery from Brines Including Seawater, Salt Lake Brine, Underground Water and Geothermal Water", Thermodynamics and Energy Engineering 90371 (2020), p. 1-39.
Swain, et al., "Recovery and recycling of lithium: A review", Separation and Purification Technology 172 (2017) 388-403.

*Primary Examiner* — Edward M Johnson
(74) *Attorney, Agent, or Firm* — ALG Intellectual Property, LLC

(57) ABSTRACT

A mobile phase including a lithium salt flows through a stationary phase including an oxygenated metal compound with affinity to the lithium salt through a Lewis acid-Lewis base interaction so that the oxygenated metal compound captures the lithium salt through the Lewis acid-Lewis base interaction. An eluent flows through the stationary phase to release the lithium salt captured by the oxygenated metal compound into the eluent. The eluent includes a Lewis base or a Lewis acid that disrupts the Lewis acid-Lewis base interaction between the lithium salt and the oxygenated metal compound. The eluent including the released lithium salt is collected after the eluent flows through the stationary phase.

18 Claims, 2 Drawing Sheets

METHOD OF USING OXYGENATED METAL COMPOUNDS FOR SELECTIVE EXTRACTION OF LITHIUM SALTS

RELATED APPLICATIONS

The present application is a continuation application of International Patent Application No. PCT/US2021/028860, filed Apr. 23, 2021, which claims priority to U.S. Provisional Patent Application No. 63/016,666, filed Apr. 28, 2020, the contents of which are hereby incorporated by reference in their entirety.

BACKGROUND INFORMATION

Lithium has major uses in energy storage as lithium batteries and a host of other technologies including silyl, alkyl and aryl-lithium reagents for synthesis of important organic compounds. Because of the large energy density of lithium ion, lithium ion batteries and prospective next generation batteries that contain lithium are the technology of choice for energy storage in consumer electronics, battery-electric vehicles, and large-scale energy storage facilities, among other applications.

Lithium is extracted from lithium chloride rich brines and from lithium-containing ores such as spodumene, petalite, and lepidolite. Current methods of lithium extraction from brine and mineral ores are laborious and inefficient. For example, lithium extracted from brines requires the evaporation of over half a million liters of water per ton of lithium carbonate in a very slow process that is weather dependent and that may take between 15 and 18 months, depending on weather conditions.

SUMMARY

The following description presents a simplified summary of one or more aspects of the apparatuses, compositions, and/or methods described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the apparatuses, compositions, and/or methods described herein in a simplified form as a prelude to the more detailed description that is presented below.

The present disclosure relates to a stationary phase material for the selective and efficient extraction of lithium salts present in brine and pulverized rock from mineral ores. This disclosure describes a low-cost stationary phase material with an oxygenated metal composition together with an extraction system and method of use for such system that may be employed for the separation of lithium salt from abundant and trace mineral elements and compounds present in brine and pulverized rock from mineral ores.

Described herein is a lithium extraction system and method for the extraction of lithium salts from brine, pulverized rock, and other clays and liquid sources containing lithium salts, even in trace amounts.

The lithium extraction system relies on a stationary phase comprising an oxygenated metal compound comprising an oxygenated bismuth compound, an oxygenated antimony compound, an oxygenated aluminum compound, an oxygenated gallium compound, and/or any combination thereof.

The oxygenated metal compound, a hard Lewis base, has affinity to the lithium salt, a hard Lewis acid, through Lewis acid-base interactions.

Additionally, the lithium extraction system employs a mobile phase carrying a material sample containing the lithium salt of interest. The mobile phase may be aqueous and has the material sample suspended or diluted in it.

Further, the lithium extraction system employs an eluent capable of releasing the lithium salt from the oxygenated metal compound in the stationary phase. The eluent may be a hard Lewis base or a Lewis acid in aqueous or gaseous phase that disrupts the Lewis acid-base interaction between the captured lithium salt and the oxygenated metal compound in the stationary phase.

Additionally, described herein is a lithium extraction method for extracting the lithium salt comprising: providing a stationary phase that includes providing an oxygenated metal compound with affinity to the lithium salt through a Lewis acid-base interaction; flowing a mobile phase with the dissolved material sample with the lithium salt through the stationary phase, wherein the oxygenated metal compound captures the lithium salt from the material sample dissolved in the mobile phase through a Lewis acid-base interaction; flowing an eluent for releasing the lithium salt from the oxygenated metal compound within a stationary phase wherein the eluent is a hard Lewis base or a Lewis acid in aqueous or gaseous phase that disrupts a Lewis acid-base interaction between the target lithium salt and the oxygenated metal compound, releasing the target lithium salt into the eluent; and, collecting the eluent with the target lithium salt after passage through the stationary phase.

BRIEF DESCRIPTION OF THE DRAWINGS

In order that the concepts described herein may be better understood, various embodiments will now be described by way of example, only, with reference to the accompanying drawings. The accompanying drawings illustrate various embodiments and are a part of the specification. The illustrated embodiments are merely examples and do not limit the scope of the disclosure. Throughout the drawings, identical or similar reference numbers designate identical or similar elements. Furthermore, the figures are not necessarily drawn to scale as one or more elements shown in the figures may be enlarged or resized to facilitate recognition and discussion.

DETAILED DESCRIPTION

Figure 1:
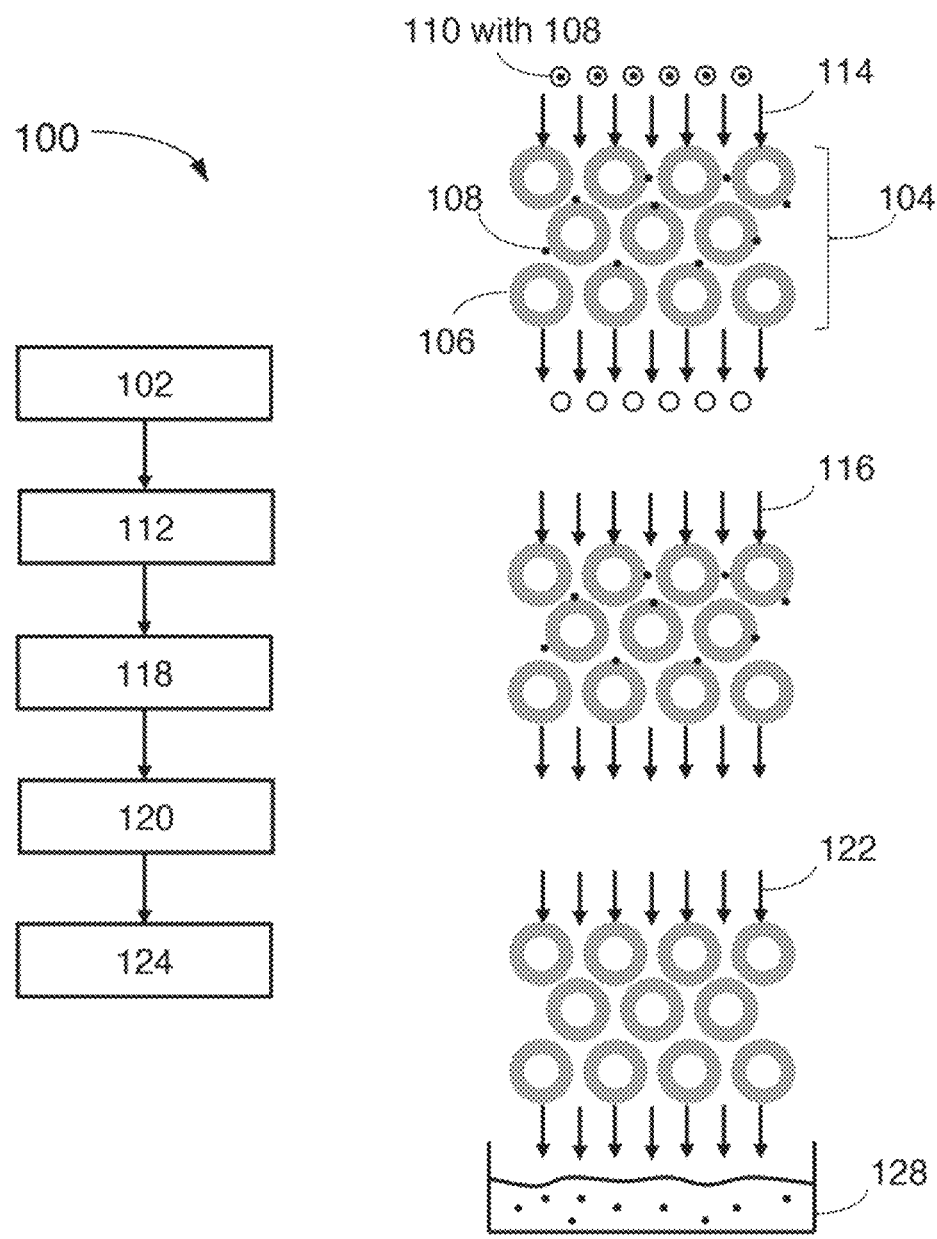
FIG. 1 illustrates a flow chart showing a lithium salt extraction method in an exemplary embodiment.

This disclosure describes oxygenated metal compounds for selective and efficient extraction of lithium ions from brine or from pulverized rock from lithium containing ores. Lithium has major uses in energy storage as lithium batteries and a host of other technologies including silyl, alkyl and aryl-lithium reagents for synthesis of important organic compounds. The metal oxide compounds described herein may be earth abundant and non-toxic.

The term "solid phase extraction" (SPE) as used herein comprises a technique for the selective extraction of compounds dissolved in a liquid mixture based on the physical and/or chemical properties of the compounds targeted for extraction.

The term "mobile phase" as used herein comprises a liquid or liquid mixture that contains a sample with target molecules.

The term "stationary phase" as used herein comprises a solid phase material with targeted chemical or physical properties that retains the target molecules as the mobile phase is allowed to pass through it.

The term "eluent" as used herein comprises a liquid, liquid mixture, or gas used to rinse the stationary phase in order to collect target compounds captured by a stationary phase.

The term "oxygenated bismuth compound" as used herein comprises a compound containing a bismuth-oxygen bond. Examples of the oxygenated metal compound include, but are not limited to, bismuth(III) oxide ($Bi_2O_3$), bismuth(IV) oxide ($Bi_2O_4$), bismuth(V) oxide ($Bi_2O_5$), bismuth hydroxide ($Bi(OH)_3$), bismuth carbonate ($C_3Bi_2O_9$), bismuth subcarbonate (($BiO)_2CO_3$), and/or any combination thereof. Bismutite, a natural mineral, contains bismuth subcarbonate.

The term "oxygenated antimony compound" as used herein comprises a compound containing an antimony-oxygen bond. Examples of the oxygenated antimony compound include, but are not limited to, antimony(III) oxide ($Sb_2O_3$), antimony(IV) oxide ($Sb_2O_4$), antimony(V) oxide ($Sb_2O_5$), antimony hydroxide ($Sb(OH)_3$), antimony carbonate ($C_3O_9Sb_2$), and/or any combination thereof.

The term "oxygenated aluminum compound" as used herein comprises a compound containing an aluminum-oxygen bond. Examples of the oxygenated aluminum compound include, but are not limited to, aluminum oxide ($Al_2O_3$), aluminum hydroxide ($Al(OH)_3$), aluminum carbonate, $Al_2(CO_3)_3$, and/or any combination thereof.

The term "oxygenated gallium compound" as used herein comprises a compound containing a gallium-oxygen bond. Examples of the oxygenated gallium compound include, but are not limited to, gallium(III) oxide ($Ga_2O_3$), gallium hydroxide ($Ga(OH)_3$), gallium(III) carbonate ($Ga_2(CO_3)_3$), and/or any combination thereof.

The term "lithium salt" as used herein comprises any salt including lithium. Examples of lithium salts include, without limitation, lithium halogen salts and lithium sulfate ($Li_2SO_4$). Lithium halogen salts include halogen atoms. Examples of lithium halogen salts include, without limitation, lithium fluoride (LiF), lithium chloride (LiCl), lithium bromide (LiBr), lithium iodide (LiI), and lithium astatide (LiAt).

The term "Lewis acid" as used herein is a chemical species that contains an empty orbital which is capable of accepting an electron pair. Lithium salts are examples of hard Lewis acids.

The term "Lewis base" as used herein is a chemical species that contains an electron pair not involved in bonding and that is available for donation to a Lewis acid forming a Lewis base-Lewis acid pair. Oxygenated metal compounds including bismuth oxides are examples of hard Lewis bases.

The term "hard Lewis base" as used herein is a compound that contains one or more electronegative, strongly solvated, and weakly polarizable atoms. These electronegative atoms have a small ionic radius and the corresponding compounds have at least one high energy HOMO orbital.

The term "oxygenated metal compound" as used herein comprises an oxygenated metal selected from oxygenated bismuth compounds, oxygenated antimony compounds, oxygenated aluminum compounds, and oxygenated gallium compounds, and/or any combination thereof.

Referring to FIG. 1, herein is shown a flow chart showing a lithium salt extraction method 100 in an exemplary embodiment. The first step 102 in the lithium salt extraction method 100 comprises providing a stationary phase 104 that includes an oxygenated metal compound 106 with affinity to a lithium salt 108 within a material sample 110.

Preferably, the stationary phase 104 presents large surface areas of the oxygenated metal compound 106. The stationary phase 104 may be solid or porous and may be composed entirely by the oxygenated metal compound 106, or the stationary phase 104 may contain other materials supporting or mixed with the oxygenated metal compound 106. The stationary phase 104 may be provided as a powder of different mesh size (such as mesh number 4 to 500), as microspheres (ranging, e.g., in size from 1 mm to several millimeters), as a porous membrane, or even as a solid surface. Basically, any form factor could be used for the stationary phase 104 as may suit a particular implementation.

The oxygenated metal compound 106 may be a selection of oxygenated bismuth compounds, oxygenated antimony compounds, oxygenated aluminum compounds, or oxygenated gallium compounds, or any combination thereof. Examples of the oxygenated metal compound 106 include bismuth-, antimony-, aluminum-, and gallium-oxides, hydroxides, and carbonates.

The lithium salt 108 may be any lithium salt. Examples of the lithium salt 108 include, but are not limited to, lithium chloride (LiCl), lithium bromide (LiBr), lithium iodine (LiI), and lithium sulfate ($Li_2SO_4$).

The material sample 110 may be a brine, pulverized hard rock, clay, or salty water that contains the lithium salt 108. The material sample 110 may originate from continental brines, oil well brines, geothermal waters, clays, and even sea water (lithium is also found at low concentrations of approximately 0.17 mg/L in seawater). Brine that occurs in the Earth's crust is called continental brine/subsurface brine. Countries with big continental brine resources include Chile, Argentina, Bolivia, and China.

The brines may contain approximately 170-330 g/L dissolved mineral salts. The brines can be accessed directly from the surface or from deep down large salt lakes. The brines may contain lithium in the form of lithium chloride (LiCl) and/or lithium sulfate ($Li_2SO_4$) in the presence of large quantities of sodium chloride (NaCl), potassium chloride (KCl), magnesium, and/or different borates.

Examples of abundant lithium hard rock ores include, but are not limited to, lepidolite ($KLi_{1.5}Al_{1.5}[Si_3O_{10}][F,OH]_2$), spodumene ($LiO_2Al_2O_34SiO_2$), petalite ($LiO_2Al_2O_38SiO_2$), and amblygonite ($LiAl[PO_4][OH,F]$). Processing of hard rock ores involves the conversion of lithium phase from alpha to beta, allowing for the lithium to be displaced by sodium. The concentrate that results from this last process may be milled into a fine powder, becoming the sample 110.

A second step 112 in the lithium salt extraction method 100 comprises flowing a mobile phase 114 with the material sample 110 with the lithium salt 108 through the stationary phase 104. The mobile phase 114 is a liquid, preferably water, with the dissolved or suspended material sample 110. As the mobile phase 114 flows through the stationary phase 104, the lithium salt 108 is affinity-captured by the oxygenated metal compound 106 in the stationary phase 104. Sodium chloride, potassium chloride and other components and impurities that are not the lithium salt 108 remain in the mobile phase 114 after it flows through the stationary phase 104.

An optional wash 116 (such as by a liquid (e.g., water) or a gas) may be provided in a third step 118 of the lithium salt extraction method 100. The purpose of the wash 116 is to remove material other than the lithium salt 108 from the stationary phase 104.

A fourth step 120 in the lithium salt extraction method 100 comprises flowing an eluent 122 through the stationary phase 104. The eluent 122 comprises a non-metallic Lewis base or a Lewis acid in aqueous or gaseous phase that disrupts the Lewis acid-base interaction between the oxygenated metal compound 106 and the lithium salt 108, releasing the lithium salt 108 into the eluent 122. Examples of the eluent 122 include, but are not limited to, a Lewis base such as ammonia (as a gas or as an aqueous solution), organic amine bases such as triethylamine, or a Lewis acid such as carbon dioxide, volatile organic and inorganic acids, such as trifluoroacetic acid ($CF_3COOH$) and hydrochloric acid (HCl), or a combination thereof.

A final step 124 in the lithium salt extraction method 100 comprises the collection of the eluent 122 with the lithium salt 108 inside a vessel 128. The eluent 122 may be collected in fractions. The purified lithium salt may be further purified using the same method, and then converted into lithium carbonate or lithium hydroxide, which are desired end products for lithium ion battery manufacturing.

The mobile phase 114 and wash 116 may be reused as mobile phase liquid in further extraction processes. Similarly, water in eluent 122 with the purified lithium salt may be evaporated in a closed system and condensed as distilled water for further use as wash 116.

Figure 2:
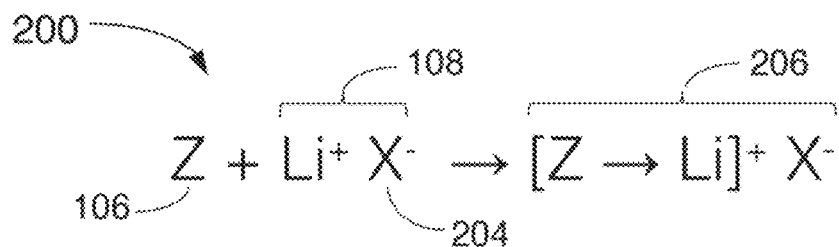
FIG. 2 shows an exemplary chemical scheme illustrating an affinity mechanism for capturing the lithium salt.

Referring now to FIG. 2, herein is shown an exemplary chemical scheme 200 illustrating an affinity mechanism for capturing the lithium salt 108. The oxygenated metal compound 106 (denoted as Z in FIG. 2) is a hard Lewis base and the lithium salt 108 (denoted as $Li^+ X^-$ in FIG. 2, which may also be denoted as $Li_2^{2+} X^{2-}$ in the case of lithium sulfate) is a hard Lewis acid. The symbol "$X^-$" in FIG. 2 (or $X^{2-}$) represents a halogen anion 204 (or sulfate anion). The oxygenated metal compound 106 and the lithium salt 108 combine through a Lewis acid-Lewis base interaction, forming an oxygenated metal/lithium salt complex 206 (denoted as $[Z{\rightarrow}Li]^+ X^-$ in FIG. 2).

Figure 3:
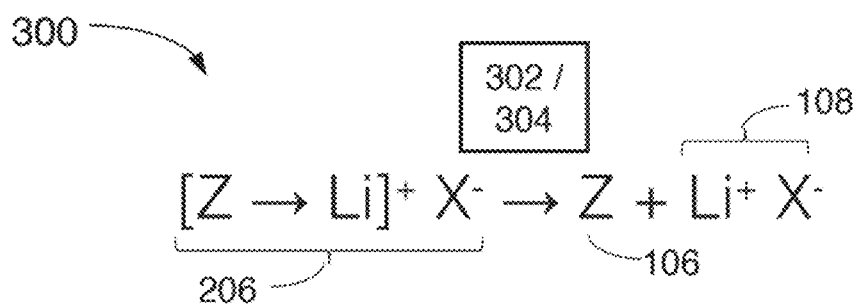
FIG. 3 shows another exemplary chemical scheme illustrating an affinity disruption mechanism for releasing the lithium salt.

Referring now to FIG. 3, herein is shown an exemplary chemical scheme 300 illustrating an affinity disruption mechanism for releasing the lithium salt 108. The oxygenated metal/lithium salt complex 206 is disrupted by a hard Lewis base 302 or a Lewis acid 304 in the eluent 122, releasing the lithium salt 108 from an oxygenated metal compound 106 within stationary phase 104 into the eluent 122. As mentioned above, examples of the hard Lewis base 302 include ammonia in aqueous or gaseous form, and examples of the Lewis acid 304 include carbon dioxide, volatile organic and inorganic acids such as trifluoroacetic acid and hydrochloric acid, or a combination thereof.

Figure 4:
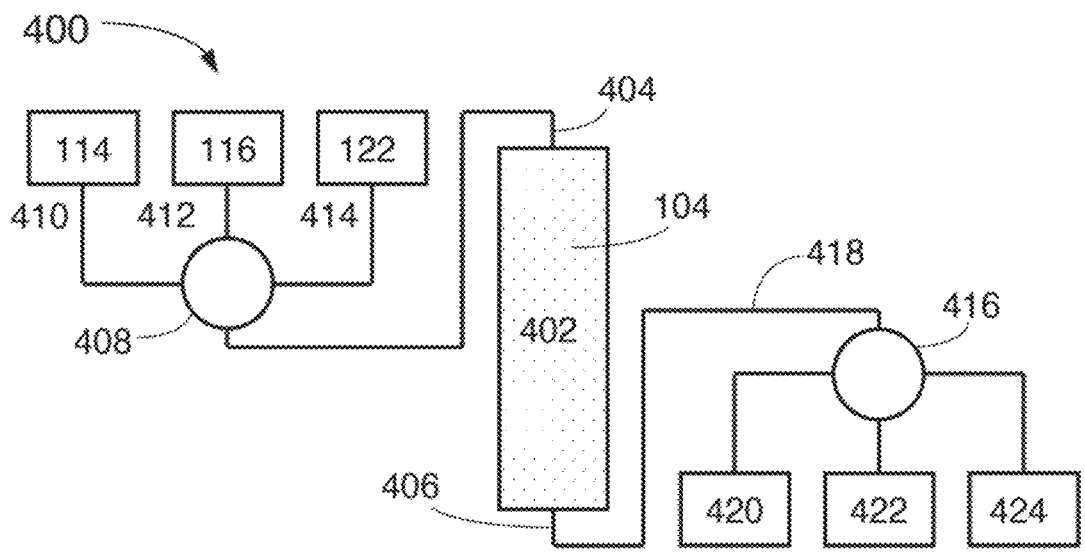
FIG. 4 illustrates an exemplary lithium salt extraction system for extracting the lithium salt from a material sample.

Referring now to FIG. 4, herein is shown an exemplary lithium salt extraction system 400 for extracting the lithium salt 108 from material sample 110. The lithium salt extraction system 400 includes a separation vessel 402 (e.g., a column) that contains the stationary phase 104. Additionally, the separation vessel 402 includes a separation vessel inlet 404 and a separation vessel outlet 406. A first selection valve 408 at the separation vessel inlet 404 may select between a first liquid stream 410 with the mobile phase 114, a second liquid stream 412 with the wash 116, or a third liquid stream 414 with the eluent 122. Similarly a second selection valve 416 at the separation vessel outlet 406 may direct a separation vessel output liquid stream 418 to a first collection vessel 420 for the mobile phase 114, a second collection vessel 422 for the wash 116, or a third collection vessel 424 (e.g., vessel 128) for the eluent 122. Therefore, the lithium salt extraction system 400 can be used to carry out the lithium salt extraction method 100 shown in FIG. 1 by activating the first selection valve 408 and the second selection valve 416 to provide the necessary step sequence in the salt extraction method 100. Alternatively, separation vessel 402 may include different inlets for different input streams. Furthermore, separation vessel 402 may include different outlets for different outlet streams.

The methods described herein may be performed in continuous or batch processes. Furthermore, the methods described herein are not limited to the systems and apparatuses described herein (e.g., in FIG. 4) but may be performed with any other suitable systems and apparatuses.

Advantages and features of the present disclosure can be further described by the following statements.

1. A method comprising: flowing a mobile phase comprising a lithium salt through a stationary phase comprising an oxygenated metal compound with affinity to the lithium salt through a Lewis acid-Lewis base interaction so that the oxygenated metal compound captures the lithium salt through the Lewis acid-Lewis base interaction; flowing an eluent through the stationary phase to release the lithium salt captured by the oxygenated metal compound into the eluent, the eluent comprising a Lewis base or a Lewis acid that disrupts the Lewis acid-Lewis base interaction between the lithium salt and the oxygenated metal compound; and collecting the eluent including the released lithium salt after the eluent flows through the stationary phase.

2. The method of statement 1, wherein the oxygenated metal compound comprises a Lewis base.

3. The method of statement 1, wherein the oxygenated metal compound comprises a metal oxide, a metal hydroxide, a metal carbonate, or a combination thereof.

4. The method of statement 1, wherein the oxygenated metal compound comprises an oxygenated bismuth compound, an oxygenated antimony compound, an oxygenated aluminum compound, an oxygenated gallium compound, or a combination thereof.

5. The method of statement 4, wherein the oxygenated bismuth compound comprises bismuth(III) oxide ($Bi_2O_3$), bismuth(IV) oxide ($Bi_2O_4$), bismuth(V) oxide ($Bi_2O_5$), bismuth hydroxide ($Bi(OH)_3$), bismuth carbonate ($C_3Bi_2O_9$), bismuth subcarbonate (($BiO)_2CO_3$), or a combination thereof.

6. The method of statement 4, wherein the oxygenated antimony compound comprises antimony(III) oxide ($Sb_2O_3$), antimony(IV) oxide ($Sb_2O_4$), antimony(V) oxide ($Sb_2O_5$), antimony hydroxide ($Sb(OH)_3$), antimony carbonate ($C_3O_9Sb_2$), or a combination thereof.

7. The method of statement 4, wherein the oxygenated aluminum compound comprises aluminum oxide ($Al_2O_3$), aluminum hydroxide ($Al(OH)_3$), aluminum carbonate ($Al_2(CO_3)_3$), or a combination thereof.

8. The method of statement 4, wherein the oxygenated gallium compound comprises gallium(III) oxide ($Ga_2O_3$), gallium hydroxide ($Ga(OH)_3$), gallium(III) carbonate ($Ga_2(CO_3)_3$), or a combination thereof.

9. The method of statement 1, wherein the lithium salt comprises a lithium halogen salt or lithium sulfate ($Li_2SO_4$).

10. The method of statement 1, wherein the mobile phase comprises a material sample dissolved or suspended in a liquid, the material sample comprising the lithium salt.

11. The method of statement 10, wherein the material sample comprises a powder obtained from a lithium-containing ore.

12. The method of statement 10, wherein the material sample comprises a lithium-containing brine.

13. The method of statement 1, wherein the eluent is aqueous.

14. The method of statement 1, wherein the eluent is non-metallic.

15. The method of statement 1, wherein the eluent comprises ammonia, an organic amine base, or a combination thereof.

16. The method of statement 1, wherein the eluent comprises carbon dioxide, trifluoroacetic acid ($CF_3COOH$), hydrochloric acid (HCl), or a combination thereof.

17. The method of statement 1, further comprising washing the stationary phase to release material captured by the oxygenated metal compound other than the lithium salt.

18. The method of statement 1, further comprising repeating the flowing the mobile phase step, the flowing the eluent step, and the collecting the eluent step using the collected eluent as the mobile phase.

19. A system for extracting a lithium salt from a material sample dissolved or suspended in a mobile phase, comprising a stationary phase comprising an oxygenated metal compound with affinity to the lithium salt through a Lewis acid-Lewis base interaction and configured to capture the lithium salt through the Lewis acid-Lewis base interaction.

20. The system of statement 19, wherein the oxygenated metal compound comprises a Lewis base.

21. The system of statement 19, wherein the oxygenated metal compound comprises a metal oxide, a metal hydroxide, a metal carbonate, or a combination thereof.

22. The system of statement 19, wherein the oxygenated metal compound comprises an oxygenated bismuth compound, an oxygenated antimony compound, an oxygenated aluminum compound, an oxygenated gallium compound, or a combination thereof.

23. The system of statement 22, wherein the oxygenated bismuth compound comprises bismuth(III) oxide ($Bi_2O_3$), bismuth(IV) oxide ($Bi_2O_4$), bismuth(V) oxide ($Bi_2O_5$), bismuth hydroxide ($Bi(OH)_3$), bismuth carbonate ($C_3Bi_2O_9$), bismuth subcarbonate ($(BiO)_2CO_3$), or a combination thereof.

24. The system of statement 22, wherein the oxygenated antimony compound comprises antimony(III) oxide ($Sb_2O_3$), antimony(IV) oxide ($Sb_2O_4$), antimony(V) oxide ($Sb_2O_5$), antimony hydroxide ($Sb(OH)_3$), antimony carbonate ($C_3O_9Sb_2$), or a combination thereof.

25. The system of statement 22, wherein the oxygenated aluminum compound comprises aluminum oxide ($Al_2O_3$), aluminum hydroxide ($Al(OH)_3$), aluminum carbonate ($Al_2(CO_3)_3$), or a combination thereof.

26. The system of statement 22, wherein the oxygenated gallium compound comprises gallium(III) oxide ($Ga_2O_3$), gallium hydroxide ($Ga(OH)_3$), gallium(III) carbonate ($Ga_2(CO_3)_3$), or a combination thereof.

27. The system of statement 19, wherein the material sample comprises a powder obtained from a lithium-containing ore.

28. The system of statement 19, wherein the material sample comprises a lithium-containing brine.

29. The system of statement 19, wherein the lithium salt comprises a lithium halogen salt or lithium sulfate ($Li_2SO_4$).

30. The system of statement 19, further comprising an eluent for releasing the lithium salt captured by the oxygenated metal compound into the eluent, the eluent comprising a Lewis base or a Lewis acid that disrupts the Lewis acid-Lewis base interaction between the lithium salt and the oxygenated metal compound.

31. The system of statement 30, wherein the eluent is aqueous.

32. The system of statement 30, wherein the eluent is non-metallic.

33. The system of statement 30, wherein the eluent comprises ammonia, an organic amine base, or a combination thereof.

34. The system of statement 30, wherein the eluent comprises carbon dioxide, trifluoroacetic acid ($CF_3COOH$), hydrochloric acid (HCl), or a combination thereof.

35. The system of statement 30, further comprising a separation vessel comprising the stationary phase; a mobile phase source connected to the separation vessel and comprising the mobile phase including the material sample; an eluent source connected to the separation vessel and comprising the eluent; and a collection vessel connected to the separation vessel and that collects the eluent including the released lithium salt after the eluent flows through the stationary phase.

36. The system of statement 35, further comprising a wash source connected to the separation vessel and comprising a wash fluid for washing material from the oxygenated metal compound other than the lithium salt.

37. A method of extracting a lithium salt from a material sample, comprising forming an oxygenated metal/lithium salt complex comprising the lithium salt and an oxygenated metal compound with affinity to the lithium salt; and releasing the lithium salt from the oxygenated metal/lithium salt complex.

38. The method of statement 37, wherein the forming the oxygenated metal/lithium salt complex comprises combining the oxygenated metal compound and the lithium salt through a Lewis acid-Lewis base interaction.

39. The method of statement 38, wherein the combining the oxygenated metal compound and the lithium salt comprises flowing a mobile phase including the material sample through a stationary phase comprising the oxygenated metal compound so that the oxygenated metal compound captures the lithium salt in the material sample through the Lewis acid-Lewis base interaction.

40. The method of statement 37, wherein the oxygenated metal compound comprises an oxygenated bismuth compound, an oxygenated antimony compound, an oxygenated aluminum compound, an oxygenated gallium compound, or a combination thereof.

41. The method of statement 38, wherein the releasing the lithium salt from the oxygenated metal/lithium salt complex comprises disrupting, by a Lewis base or a Lewis acid in aqueous or gaseous phase, the Lewis acid-Lewis base interaction between the lithium salt and the oxygenated metal compound.

42. The method of statement 41, wherein the disrupting the Lewis acid-Lewis base interaction comprises flowing an eluent comprising the Lewis base or the Lewis acid through the oxygenated metal compound/lithium salt complex to release the lithium salt from the oxygenated metal compound/lithium salt complex into the eluent.

43. The method of statement 41, wherein the Lewis base comprises ammonia, an organic amine base, or a combination thereof.

44. The method of statement 41, wherein the Lewis acid comprises carbon dioxide, trifluoroacetic acid ($CF_3COOH$), hydrochloric acid (HCl), or a combination thereof.

45. The method of statement 37, wherein the material sample comprises at least one of a lithium-containing brine or a powder obtained from a lithium-containing ore.

46. The method of statement 37, further comprising collecting the lithium salt released from the oxygenated metal/lithium salt complex.

In the preceding description, various exemplary embodiments have been described with reference to the accompanying drawings. It will, however, be evident that various modifications and changes may be made thereto, and additional embodiments may be implemented, without departing from the scope of the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    flowing a mobile phase comprising a lithium salt through a stationary phase comprising an oxygenated metal compound with affinity to the lithium salt through a Lewis acid-Lewis base interaction so that the oxygenated metal compound captures the lithium salt through the Lewis acid-Lewis base interaction;
    flowing an eluent through the stationary phase to release the lithium salt captured by the oxygenated metal compound into the eluent, the eluent comprising a Lewis base or a Lewis acid that disrupts the Lewis acid-Lewis base interaction between the lithium salt and the oxygenated metal compound; and
    collecting the eluent including the released lithium salt after the eluent flows through the stationary phase.

2. The method of claim 1, wherein the oxygenated metal compound comprises a Lewis base.

3. The method of claim 1, wherein the oxygenated metal compound comprises a metal oxide, a metal hydroxide, a metal carbonate, or a combination thereof.

4. The method of claim 1, wherein the oxygenated metal compound comprises an oxygenated bismuth compound, an oxygenated antimony compound, an oxygenated aluminum compound, an oxygenated gallium compound, or a combination thereof.

5. The method of claim 1, wherein the lithium salt comprises a lithium halogen salt or lithium sulfate ($Li_2SO_4$).

6. The method of claim 1, wherein the mobile phase comprises a material sample dissolved or suspended in a liquid, the material sample comprising the lithium salt.

7. The method of claim 1, wherein the eluent comprises ammonia, an organic amine base, or a combination thereof.

8. The method of claim 1, wherein the eluent comprises carbon dioxide, trifluoroacetic acid ($CF_3COOH$), hydrochloric acid (HCl), or a combination thereof.

9. The method of claim 1, further comprising washing the stationary phase to release material captured by the oxygenated metal compound other than the lithium salt.

10. The method of claim 1, further comprising repeating the flowing the mobile phase step, the flowing the eluent step, and the collecting the eluent step using the collected eluent as the mobile phase.

11. A method of extracting a lithium salt from a material sample, comprising:
    forming an oxygenated metal/lithium salt complex comprising the lithium salt and an oxygenated metal compound with affinity to the lithium salt; and
    releasing the lithium salt from the oxygenated metal/lithium salt complex;
    wherein the forming the oxygenated metal/lithium salt complex comprises combining the oxygenated metal compound and the lithium salt through a Lewis acid-Lewis base interaction.

12. The method of claim 11, wherein the combining the oxygenated metal compound and the lithium salt comprises flowing a mobile phase including the material sample through a stationary phase comprising the oxygenated metal compound so that the oxygenated metal compound captures the lithium salt in the material sample through the Lewis acid-Lewis base interaction.

13. The method of claim 11, wherein the oxygenated metal compound comprises an oxygenated bismuth compound, an oxygenated antimony compound, an oxygenated aluminum compound, an oxygenated gallium compound, or a combination thereof.

14. The method of claim 11, wherein the releasing the lithium salt from the oxygenated metal/lithium salt complex comprises disrupting, by a Lewis base or a Lewis acid in aqueous or gaseous phase, the Lewis acid-Lewis base interaction between the lithium salt and the oxygenated metal compound.

15. The method of claim 14, wherein the disrupting the Lewis acid-Lewis base interaction comprises flowing an eluent comprising the Lewis base or the Lewis acid through the oxygenated metal compound/lithium salt complex to release the lithium salt from the oxygenated metal compound/lithium salt complex into the eluent.

16. The method of claim 15, wherein the eluent comprises the Lewis base and the Lewis base comprises ammonia, an organic amine base, or a combination thereof.

17. The method of claim 15, wherein the eluent comprises the Lewis acid and the Lewis acid comprises carbon dioxide, trifluoroacetic acid ($CF_3COOH$), hydrochloric acid (HCl), or a combination thereof.

18. The method of claim 11, further comprising collecting the lithium salt released from the oxygenated metal/lithium salt complex.

* * * * *